(12) United States Patent
Enz et al.

(10) Patent No.: US 10,192,121 B2
(45) Date of Patent: Jan. 29, 2019

(54) DISPLAY DEVICE FOR A VEHICLE, IN PARTICULAR A COMMERCIAL VEHICLE

(71) Applicants: Andreas Enz, Columbia, SC (US); Werner Lang, Ergersheim (DE)

(72) Inventors: Andreas Enz, Columbia, SC (US); Werner Lang, Ergersheim (DE)

(73) Assignee: MEKRA LANG NORTH AMERICA, LLC, Ridgeway, SC (US)

( * ) Notice: Subject to any disclaimer, the term of this patent is extended or adjusted under 35 U.S.C. 154(b) by 424 days.

(21) Appl. No.: 14/857,979

(22) Filed: Sep. 18, 2015

(65) Prior Publication Data

US 2016/0086042 A1 Mar. 24, 2016

(30) Foreign Application Priority Data

Sep. 19, 2014 (DE) .......................... 10 2014 014 662

(51) Int. Cl.
| | |
|---|---|
| *G06K 9/00* | (2006.01) |
| *G06T 11/00* | (2006.01) |
| *H04N 5/225* | (2006.01) |
| *H04N 5/232* | (2006.01) |
| *B60R 1/00* | (2006.01) |

(52) U.S. Cl.
CPC ............ *G06K 9/00805* (2013.01); *B60R 1/00* (2013.01); *G06K 9/00771* (2013.01); *G06T 11/00* (2013.01); *H04N 5/2253* (2013.01); *H04N 5/23293* (2013.01); *B60R 2300/305* (2013.01)

(58) Field of Classification Search
CPC .............................. G06K 9/00805; B60R 1/00
See application file for complete search history.

(56) References Cited

U.S. PATENT DOCUMENTS

| | | | |
|---|---|---|---|
| 7,592,928 B2 | 9/2009 | Chinomi et al. | |
| 7,660,438 B2 * | 2/2010 | Camus | B60R 21/013 382/104 |
| 8,305,204 B2 | 11/2012 | Asano et al. | |
| 8,305,444 B2 | 11/2012 | Hada | |

(Continued)

FOREIGN PATENT DOCUMENTS

| | | |
|---|---|---|
| DE | 10 2010 010912 | 12/2010 |
| DE | 10 2010 042026 | 4/2012 |

(Continued)

*Primary Examiner* — Jayanti K Patel
*Assistant Examiner* — Ifran Habib
(74) *Attorney, Agent, or Firm* — Cozen O'Connor

(57) ABSTRACT

A display system and method for displaying an image to the driver of a vehicle, in particular a commercial vehicle. The display system has a capturing device mountable to the vehicle and adapted to capture at least part of the vehicle's immediate environment, and to generate signals corresponding to the captured part of the vehicle's immediate environment, a calculation unit adapted to receive the signals generated by the capturing device, determine obstacles within the captured immediate environment of the vehicle, and generate a display image illustrating the vehicle in stylized or symbolic representation, and the obstacle identified in the vehicle's immediate environment as well as its relative position with regard to the vehicle, and a rendering unit adapted to display the display image generated by the calculation unit within the vehicle and visible for the driver.

15 Claims, 5 Drawing Sheets

(56) References Cited

U.S. PATENT DOCUMENTS

| | | | |
|---|---|---|---|
| 8,593,521 B2 * | 11/2013 | Schofield | G06K 9/00818 348/148 |
| 8,810,381 B2 | 8/2014 | Fong et al. | |
| 9,676,330 B2 * | 6/2017 | Takemae | G06T 7/593 |
| 9,796,330 B2 * | 10/2017 | Mitsuta | B60R 1/00 |
| 9,933,264 B2 * | 4/2018 | Monterroza | G05D 1/0055 |
| 2006/0192660 A1 | 8/2006 | Watanabe et al. | |
| 2007/0152804 A1 * | 7/2007 | Breed | B60N 2/2863 340/435 |
| 2008/0036576 A1 * | 2/2008 | Stein | B60R 1/00 340/425.5 |
| 2008/0205706 A1 | 8/2008 | Hongo | |
| 2008/0239076 A1 * | 10/2008 | Luo | G06K 9/00798 348/148 |
| 2009/0160940 A1 * | 6/2009 | Imamura | B60R 1/00 348/159 |
| 2010/0123778 A1 | 5/2010 | Hada | |
| 2011/0103650 A1 * | 5/2011 | Cheng | B60R 1/00 382/104 |
| 2012/0062743 A1 * | 3/2012 | Lynam | B60Q 9/005 348/148 |
| 2012/0194355 A1 * | 8/2012 | Thomas | B60R 1/00 340/932.2 |
| 2012/0200664 A1 * | 8/2012 | Lang | B60R 1/00 348/36 |
| 2013/0093887 A1 * | 4/2013 | Wu | G06K 9/00805 348/148 |
| 2013/0107052 A1 * | 5/2013 | Gloger | G01S 7/22 348/148 |
| 2014/0019005 A1 | 1/2014 | Lee et al. | |
| 2014/0036064 A1 * | 2/2014 | Lu | B60Q 9/005 348/118 |
| 2014/0098229 A1 * | 4/2014 | Lu | H04N 7/181 348/148 |
| 2014/0118551 A1 | 5/2014 | Ikeda et al. | |
| 2014/0152774 A1 * | 6/2014 | Wakabayashi | G08G 1/168 348/46 |
| 2014/0226008 A1 | 8/2014 | Lang et al. | |
| 2014/0277943 A1 * | 9/2014 | Lee | B62D 15/0295 701/41 |
| 2014/0293057 A1 * | 10/2014 | Wierich | G02B 5/10 348/148 |
| 2014/0313339 A1 * | 10/2014 | Diessner | H04N 7/18 348/148 |
| 2014/0379218 A1 * | 12/2014 | Foltin | B60Q 1/085 701/41 |
| 2015/0160340 A1 * | 6/2015 | Grauer | G01S 17/89 356/5.04 |
| 2015/0224933 A1 * | 8/2015 | Higgins-Luthman | B60R 1/00 348/118 |
| 2015/0331236 A1 * | 11/2015 | Roth | B60K 37/00 348/48 |
| 2015/0339589 A1 * | 11/2015 | Fisher | G06N 99/005 706/12 |
| 2015/0360697 A1 * | 12/2015 | Baek | B60W 40/09 701/23 |
| 2016/0375592 A1 * | 12/2016 | Szatmary | B25J 5/00 700/255 |
| 2017/0106750 A1 * | 4/2017 | Tauchi | B60R 1/00 |
| 2017/0270375 A1 * | 9/2017 | Grauer | G01S 17/107 |
| 2018/0268695 A1 * | 9/2018 | Agnew | B60W 50/0098 |

FOREIGN PATENT DOCUMENTS

| | | |
|---|---|---|
| DE | 10 2011 010 624 | 10/2014 |
| JP | 07-223488 | 8/1995 |
| JP | 2003-044994 | 2/2003 |
| JP | 2006-252389 | 9/2006 |
| JP | 2011-218891 | 11/2011 |
| JP | 2012-508933 | 4/2012 |
| JP | 2014-151911 | 8/2014 |
| KR | 10-2014-0007709 | 1/2014 |

* cited by examiner

DISPLAY DEVICE FOR A VEHICLE, IN PARTICULAR A COMMERCIAL VEHICLE

BACKGROUND OF THE INVENTION

1. Field of the Invention

The present invention relates to a display system for vehicles, in particular commercial vehicles, as well as to a method for displaying a display image to the driver of a vehicle, in particular a commercial vehicle.

2. Description of the Related Art

Usually, vehicles are equipped with systems for indirect vision to the immediate environment of the vehicle, as, for example, side mirrors. In commercial vehicles, for example, a main mirror is provided on both the driver's side and the passenger's side as a device for indirect vision, by means of which the driver may view a plane and horizontal part of the lane having a specified width, which extends from a predetermined distance behind the driver's eye point up to the horizon. A strip of smaller width is also visible for the driver by means of these mirrors; this strip, however, already begins at a shorter distance behind the driver's eye point.

Additionally to these main mirrors, wide-angle mirrors are provided on both sides of the vehicle, by means of which a respective portion behind the driver's eye point is visible up to a predetermined distance in the longitudinal direction of the vehicle, said portion being broader than the portion being visible by means of the main mirror, but only extending to a predetermined length along the vehicle.

Further, parking assistance systems for passenger vehicles are known, where a display inside the vehicle may display at least a stylized representation of the passenger vehicle from a bird's eye view. Sensors may capture an immediate vehicle environment. If an obstacle is determined, corresponding signals on the display start blinking.

In recent times, it has been increasingly considered to use, additionally to conventional mirrors as systems for indirect vision, camera systems or image capturing systems as systems for indirect vision, either in addition to or as replacement for said mirrors. In these image capturing systems, an image capturing unit continuously captures an image, and the (video) data captured by the image capturing unit are, for example by means of a calculation unit and, if necessary, after further processing, supplied to a rendering unit within the driver's cabin where the vehicle environment and possibly additional information as, for example, watch notices, distances and the like for the area around the vehicle are continuously and visibly displayed to the driver.

Despite these prescribed mirrors or systems for indirect vision, however, it is hardly possible or at least very difficult for a driver to always completely and adequately keep in view the critical areas around a commercial vehicle. Moreover, due to the number of mirrors, it is hard for the driver to simultaneously view these mirrors.

Especially in commercial vehicles like trucks, busses, etc. visibility is critical on the driver's sides. Obstacles or other road users are poorly recognized, as the blind angle ranges are relatively large and, thus, obstacles as, for example, other road users are not visible in the system for indirect vision. Moreover, orientation is difficult for the driver due to the comparatively large number of devices for indirect vision, so that there is the danger of overlooking obstacles, in particular when turning or shunting, although these obstacles are depicted in the system for indirect vision. Consequently, accidents are often caused due to the fact that the driver of the commercial vehicle does not adequately view areas on the side of the vehicle, in particular in the dead angle ranges, which are an area at the side of the vehicle, which is non-visible or only poorly visible for the driver despite the above described exterior mirrors.

It is therefore known to mark obstacles on a rendered image by graphical display as, for example colored frames or the like. Acoustic or visual warning signals by means of loudspeakers or light effects are also known as a means for indicating obstacles in the vehicle's immediate environment. Here, it is disadvantageous that the graphical displays conceal parts of the rendered image and, thus, the exact location of the obstacle on the rendered image may often be unclear or orientation for the driver may be more difficult.

DE 10 2011 010 624 further discloses a display system for legally prescribed fields of vision of a commercial vehicle within a driver's cabin of the commercial vehicle, the display system comprising at least a display unit adapted to display at least two of the legally prescribed fields of vision permanently and in in real time on the display unit in the driver's cabin.

U.S. Pat. No. 8,810,381 B2 discloses a head-up display for a vehicle having a collision warning system. Here, various points of information are projected in series on the windshield, which is superimposed by the real image that is directly perceived by the driver.

U.S. Pat. No. 7,592,928 B2 discloses a system and method for image representation, which enables monitoring any differences between the relative position of an obstacle as it appears in an image representation in the bird's eye view, and its current relative position, on the same display. For this purpose, an image in the bird's eye view is generated from a number of captured images, which image shows the vehicle environment. Then, the image in the bird's eye view and an individual image captured by the camera are simultaneously displayed, in case an obstacle has been determined in the vehicle environment.

Further drive assistance systems are known from U.S. Pat. No. 8,305,204 B2, US 2014/0118551 A1, US 2008/0205706 A1, and U.S. Pat. No. 8,305,444 B2.

In the known systems and methods at least one real image, which is usually captured by a camera, is displayed by a rendering unit in real time and visible for the driver in order to provide the driver with insights of poorly visible areas. The real images captured by the camera are a detailed representation of the scenery in the vehicle's environment at the time of recording. Thus, the real images captured by the camera comprise an abundance of information, and not all of this information may be of interest for the driver of the vehicle.

SUMMARY OF THE INVENTION

It is therefore an object to provide a display system for a vehicle, in particular commercial vehicle, which informs the driver about obstacles in the vehicle environment in a reliable and simplified manner. Further, it is intended to provide a method for displaying a display image, which comprises information about at least part of the vehicle environment, to the driver.

This object is solved by a display system for vehicles, in particular commercial vehicles, comprising the features of claim 1, and a method comprising the features of claim 12. Preferred embodiments are specified in the dependent claims.

In the description of the teachings, directions relate to a vehicle, in particular commercial vehicle, during normal forward driving. In lateral direction therefore means the direction perpendicular to the forward direction vector of the vehicle, which corresponds to a left-right direction. Further, the term "immediate environment of the vehicle" describes an area beginning directly adjacent to the vehicle and extending to a predetermined distance, for example about 5 m, around the vehicle. In contrast, the term "remote vehicle environment" describes an area adjacent to the immediate environment of the vehicle and extending outward from the immediate environment of the vehicle. In contrast thereto, the term "remote vehicle environment" describes an area which boarders with the "immediate vehicle environment" and which extends outwardly from the immediate vehicle environment. For example, the term "remote vehicle environment" describes an area around the vehicle, which area has a distance to the vehicle that is larger than the above-described 5 m. Further, the term "stylized representation" means a representation of an object whose natural or real appearance is abstracted, and of which only the fundamental structures are illustrated. Moreover, the term "symbolic representation" means a representation of an object whose natural or real appearance is significantly modified and illustrated in the form of a predetermined symbol.

Further, in the description, the term obstacle relates to any objects that may be located in the immediate or remote vehicle environment while the vehicle, in particular commercial vehicle is driving. Obstacles are, for example, objects that are of interest for the driver, e.g. objects the vehicle may collide with and cause an accident. Exemplary obstacles are in particular moving objects like other road users, vehicles, cyclists, motorcyclists, pedestrians, etc., for which the vehicle poses an increased risk, and which in turn pose an increased risk for the vehicle.

Besides these movable obstacles there are, however, also stationary objects as, for example, road signs, street posts, street lamps, dustbins, advertising columns, parked vehicles or other stationary objects which may also be of interest for the driver. This information may, for example be advantageous when maneuvering out of a parking space or during shunting, to prevent that the driver accidentally overlooks a stationary object and collides therewith. Preferably, however, the movable objects are of primary interest for the driver. Additionally, however, those stationary objects that are of interest for the driver with regard to the present driving behavior and driving manoeuver, and which are critical, e.g. when turning at a crossing, a street lamp which is in the area of a lane, may also be considered as obstacles in the sense of the present application.

The teachings are based on the idea to provide a display system for a vehicle, in particular commercial vehicle, which comprises a capturing device mountable to the vehicle, a calculation unit associated with the capturing device, and a rendering unit associated with the calculation unit. The capturing device is adapted to capture at least part of the immediate environment of the vehicle, and to generate signals corresponding to the captured part of the immediate environment of the vehicle. The calculation unit is adapted to receive the signals generated by the capturing device/acquisition system, to determine obstacles in the captured vehicle environment, and to generate a display image. The display image includes a stylized or symbolic representation of the vehicle and, if at least one obstacle is determined, the stylized or symbolic representation of the at least one obstacle. On the display image, the at least one determined obstacle is arranged at a position relative to the vehicle that corresponds to its actual position relative to the vehicle in reality. The rendering unit is adapted to display the display image generated by the calculation unit within the vehicle and visible for the driver.

Furthermore, the teachings are based on the idea to provide a method for displaying a display image to the driver of a vehicle, in particular commercial vehicle. The method comprises the acquisition of at least part of an immediate vehicle environment, determination of obstacles in the captured immediate vehicle environment, and displaying a display image within the vehicle and visible for the driver. The display image includes a stylized or symbolic representation of the vehicle and, if at least one obstacle has been determined, the stylized or symbolic representation of the at least one obstacle, as well as its position relative to the vehicle.

The display system and method provide a display image for the driver where a representation of the vehicle and at least one determined obstacle, which is in the immediate vehicle environment, are illustrated in a stylized or symbolic representation, respectively. Thus, the current vehicle environment may be illustrated to the driver in a stylized and simplified manner, and the driver may be provided with quick, uncomplicated, and reliable information about possible obstacles in the immediate vehicle environment. Thus, only necessary and relevant information about the vehicle environment is provided and displayed to the driver, and, consequently, the driver may get information about the vehicle environment "at a glance", without being distracted by additional, irrelevant or disturbing and confusing information. Additional, irrelevant information that may be disturbing and confusing for the driver are, for example, (video) displays showing uncritical objects like trees, buildings, backgrounds, and uncritical objects. The background of the display image is preferably neutral, for example a plain background, where the vehicle and the determined obstacles are represented in a stylized or symbolic manner, which enables the driver to readily and easily gather the required information.

The display device may be configured such that at least two different symbols, which may be allocated with different types of obstacles, in particular moving and stationary obstacles, respectively, are stored therein, and may be adapted to display at least one of the symbols at a respective point in time. Further, as explained in more detail below, the display device may be adapted to choose the type of symbol to be displayed depending on its distance with regard to the vehicle (i.e. relative position) and/or dependent on the type of obstacle (in particular, moving or stationary obstacles).

On the display image, the vehicle and the determined obstacle are preferably illustrated in top view. In a further embodiment, the display image illustrates the vehicle and the determined obstacle in bird's eye view in the forward direction of the vehicle from rear to front, but other known representational perspectives are also possible. With the two mentioned perspectives, it is easier for the driver to quickly overview the immediate vehicle environment, as he may quickly and reliably orient himself by means of the stylized or symbolic representations, in particular the representation of his vehicle.

In a further embodiment of the display system and the method, the kind and/or dimension of the determined obstacle may be determined and the stylized or symbolic representation of the determined obstacle may be modified dependent on the identified kind and/or dimension of the obstacle. By means of the modified representation of the obstacle or the symbol chosen for the obstacle, the driver may quickly gather from the display image, which kind of obstacle he has to deal with, e.g. pedestrian, cyclist, motorcyclist, or another vehicle. Here, each kind of obstacle may be assigned to a different symbol, e.g. circle, rectangle, square, triangle or the like, which points to the corresponding type of obstacle. Additionally or alternatively, the dimension of the obstacle may be determined and taken into account in the stylized or symbolic representation. A small vehicle may, for example, be represented by a smaller symbol than a large bus, although both the small vehicle and the large bus may be represented by the same symbol.

In a further embodiment of the display system and method, at least part of a remote vehicle environment may be additionally captured. The display image may be modified such that it includes at least one information portion, which points to an obstacle determined in the remote vehicle environment and to the position of the determined obstacle relative to the vehicle. The display image may, for example, be provided with an image strip in its lower and/or upper portion, which serves as an information portion that may, for example, blink, change color, or give any other hint in case an obstacle has been determined in the remote vehicle environment.

The rendering unit is preferably adapted to project the display image on the windshield of the vehicle or on a separate screen mounted in the driver's cabin of a vehicle, which may be transparent, semi-transparent or not transparent, for example by means of a head-up display or an OLED (Organic Light Emitting Diode) display. By projecting the display image on the windscreen, an at least partly transparent image is generated, which only negligibly affects the driver's direct view through the windshield. Thus, the driver may continue safely controlling the vehicle due to the direct view and, at the same time continue gathering information about possible obstacles in the immediate and remote vehicle environment by means of the display image. Preferably, the display image is projected on a lower portion of the windshield and centrically ahead of the driver, so that the driver may swivel from the direct view to the display image and back to direct view without requiring larger movements of the eyes or the head. This also contributes to quick, uncomplicated and reliable information about the vehicle environment.

In a further embodiment of the display system and method, the display image may also be projected on other surfaces inside the vehicle like, for example, an A-pillar. Alternatively, the display image may also be output on a display arranged inside the vehicle, e.g. on the display of a navigation device that is not currently used. In a further embodiment, the display image may be illustrated on a display or screen within the driver's cabin and visible for the driver.

Preferably, the acquisition device is formed to capture the entire immediate vehicle environment, i.e. the complete area extending immediately around the vehicle. Thus, the display system is able to capture the entire immediate vehicle environment and evaluate the same with regard to obstacles. The driver may therefore be provided with a display image that provides him with information about all objects within the immediate vehicle environment.

In a further embodiment of the display system and method, the acquisition device may capture the immediate and remote vehicle environment by means of radar sensors and/or ultrasonic sensors and/or image capturing units like, for example, cameras, which can be attached to the vehicle, in particular commercial vehicle. The radar sensors and/or ultrasonic sensors and/or image capturing units may submit corresponding signals to the calculation unit, which signals may then be evaluated with regard to obstacles. Alternatively or additionally, the radar sensors and/or ultrasonic sensors and/or image capturing units may directly determine an obstacle in the captured part of the vehicle environment and submit a corresponding signal to the calculation unit. Further, it may be advantageous to determine the motion speed and/or motion direction of the obstacle on the display image based on the temporal change of the position of the obstacle.

In a further embodiment of the display system and method, the determination of the kind of the obstacle may be based on the motion behavior of the captured obstacle. Here, previously determined obstacle data may be stored in a memory of the calculation unit and taken into account when determining new obstacles. A pedestrian, for example, may abruptly change direction while another vehicle like, for example, an automobile, may only carry out specific changes of direction in a given period of time.

In a further embodiment of the display system and the method, the display image may be modified such that a plurality of obstacles of the same kind, which are located in a certain area relative to the vehicle, may be combined to a group of obstacles and provided with a visual indication, e.g. a bracket or frame around the group of obstacles. This additionally simplifies the display image and may qualitatively inform the driver about obstacles in the bracket and correspondingly indicate the same.

In a further embodiment of the display system or method, the display image permanently shows the stylized or symbolic representation of the vehicle. Moreover, it is preferred that the rendering unit is adapted to illustrate the display image generated and received by the calculation unit permanently and in real time. Also the acquisition unit is preferably adapted to capture part of the immediate and/or remote vehicle environment permanently and in real time. Preferably, also the calculation unit is then adapted to process the received signals permanently and in real time. Here, permanently means that, for example, display of the display image is not (temporally) interrupted by other information, so that the driver may view the vehicle environment at any time when looking at the rendering unit, and may be informed about relevant obstacles. The state described by and included in "permanently" may optionally be extended to an ignited state of the vehicle or, for example to a state where the driver is located within the vehicle, e.g. dependent on an acquisition of a key device near or within the vehicle.

Moreover, it is advantageous that the vehicle is located centrally on the display image, so that the vehicle environment shown on the display image is about the same in all directions and the driver is provided with equal information about the entire immediate vehicle environment.

In a further embodiment of the display system or method, the stylized or symbolic representation of the vehicle may be effected as a reproduction of the vehicle that is applied to a display, instead of being effected in digital form on the display image. As an orientation for the driver, a molded part may be affixed to the display as the vehicle, and behind, on the display, the display image may be digitally illustrated, merely showing the determined obstacles.

In a further embodiment of the display system or method, motion speed and/or motion direction of the identified obstacle may be determined and the stylized or symbolic representation of the identified obstacle may be modified dependent on the determined motion speed and/or motion direction. For example, the form of the symbol for the obstacle on the display image may be distorted dependent on the motion speed of the obstacle and, thus, preferably may show the approximate motion direction and, dependent on the degree of distortion, the motion speed of the obstacle. A standing pedestrian may, for example be illustrated as circular dot, while a moving pedestrian may be illustrated by an oval or elliptical dot. Additionally or alternatively, the longitudinal axis of the oval or elliptical dot may indicate the motion direction of the obstacle. Additionally or alternatively, the calculation unit may generate an arrow in the display image, which indicates the motion direction of the obstacle. The length of the arrow may be chosen proportionally to the speed of the obstacle.

In a further embodiment of the display system or method, the display image may be divided into a plurality of zones, which may be arranged, for example, concentrically around the stylized or symbolic representation of the vehicle on the display image. The plurality of zones preferably illustrate critical and less critical zones, wherein the critical zones are closer to the vehicle and the less critical zones are farther away from the vehicle. The zones may, for example, be illustrated on the display image in the form of lines or, alternatively, may be invisible. Dependent on the position of an identified obstacle relative to the vehicle, the calculation unit may be further adapted to determine in which zone the identified obstacle is located. Dependent thereon, the calculation unit may be adapted to modify the stylized or symbolic representation of the obstacle on the display image, e.g. to illustrate the same by means of different colors or with different brightness (brightness levels) or by a specified other symbol or with different size. In other words, the display device may illustrate the obstacle(s) dependent on its/their distance differently.

In a further embodiment of the display system or method, the display image may further be modified such that it additionally comprises road lines defining the vehicle lane. In case the driver accidentally drifts out of his lane, for example without actuating the indicators, the road lines, to which the vehicle drifts from the optimum lane, may be graphically highlighted. Thus, the calculation unit may further provide a kind of lane departure assistance for the driver.

In a further embodiment of the display system or method, the lanes may be displayed permanently and/or unchangeably on the display image. Here, the permanently illustrated road lines, showing the lane of the vehicle, may assist the driver and support better and quicker orientation on the display image.

In a further embodiment of the display system or method, the temporal change of the representation of the obstacle on the display image may be effected continuously, i.e. in real time, or clocked, i.e. in time intervals. Thus, the motion of the obstacle may be displayed flowingly or hesitantly, i.e. stepwise.

In a further embodiment of the display system or method, the trajectory of an object in the immediate vehicle environment may be recorded and illustrated in the form of an obstacle track, wherein the illustrated obstacle track, which consists of various previously displayed positions of the obstacle, fades and becomes transparent with time. Thus, the driver can be informed about the past trajectory of the obstacle and possibly may be able to estimate a future trajectory.

In a further embodiment of the display system or method, the future trajectory of the obstacle may be estimated and displayed on the display image, e.g. by means of an arrow or an expected future track of the obstacle. Here, the type of obstacle may be determined by means of object recognition, wherein each determined type of obstacle may be allocated with a motion behavior. The allocated motion behaviors for specific types of obstacles may be stored in a memory or data base.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the teachings are exemplarily described by means of the attached figures, wherein.

DETAILED DESCRIPTION OF THE PRESENTLY PREFERRED EMBODIMENTS

Figure 1:
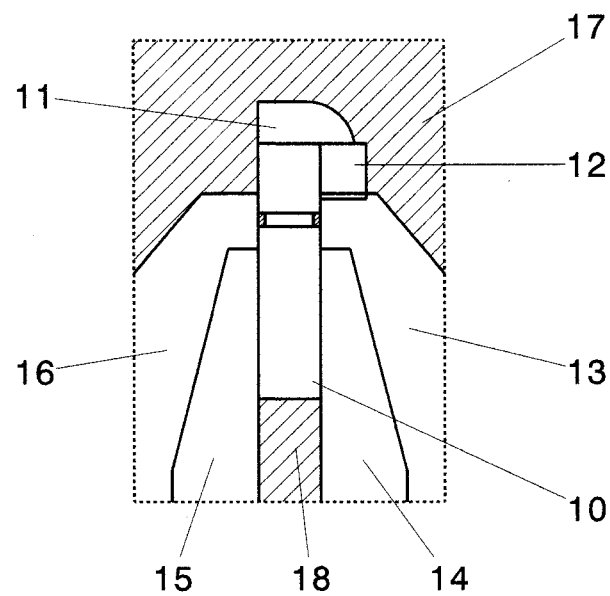
FIG. 1 shows a schematic representation of the fields of vision displayed by the device for indirect vision.

FIG. 1 schematically shows the immediate environment of a vehicle 10, in particular a commercial vehicle. The non-hatched regions 11-16 illustrate regions that can be viewed by means of a front mirror, a front side mirror, and the main mirrors and wide-angle mirrors. In contrast, the hatched regions 17 and 18 of FIG. 1 illustrate regions that cannot be viewed by means of the devices for indirect vision.

Figure 2:
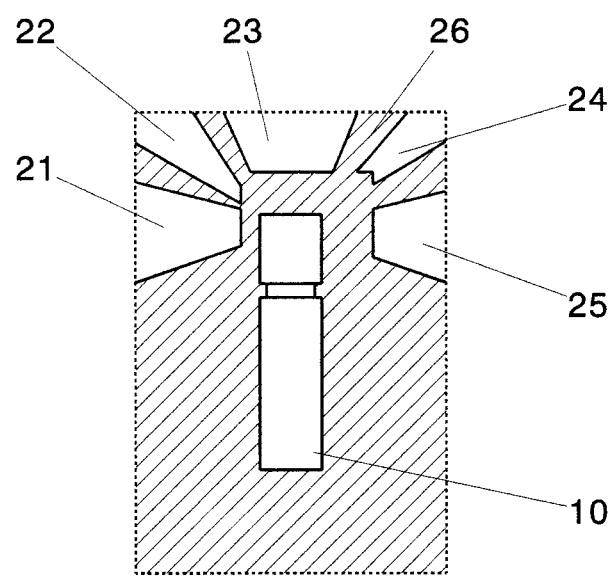
FIG. 2 shows a schematic representation of the fields of vision viewed by direct view of the driver.

Referring now to FIG. 2, the fields of vision of FIG. 1 which can be directly viewed by the driver of the vehicle 10, are schematically shown. The non-hatched regions 21-25 respectively show regions that can be directly viewed by the driver. On the other hand, there is the hatched portion 26 of FIG. 2, which illustrates the region that cannot be directly viewed by the driver of the vehicle 10. For example, region 26 separates regions 22 and 23 and regions 23 and 26, respectively, due to the fact that the A-pillars of the vehicle 10 obscure direct vision. Similarly, the main mirrors and wide-angle mirrors arranged on the outside of the vehicle 10 (cf. FIG. 5) partly obscure direct vision, and this is why region 26 separates regions 21 and 22 and regions 24 and 25, respectively, from each other.

Figure 3:
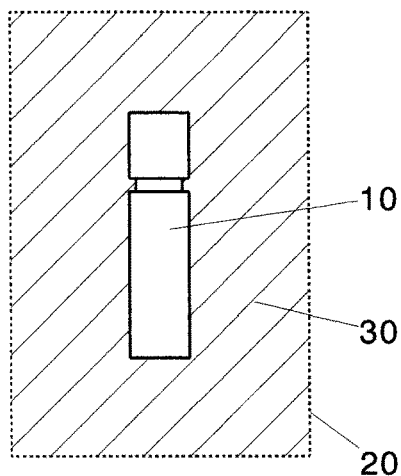
FIG. 3 shows an exemplary representation of a perspective representation of a display image.

Due to the non-visible regions 17, 18, and 26 of FIGS. 1 and 2, there is a need to preferably capture the entire immediate vehicle environment and illustrate the same in a joint representation, in order to reliably and quickly inform the driver of the vehicle about the entire immediate vehicle environment. Here, FIG. 3 shows a display image 20 generated by a display system and visible for the driver. The display image 20 includes a stylized representation of the vehicle 10 as shown in FIG. 3, as well as an immediate vehicle environment 30 as captured by a capturing device of the display system. The display image 20 of FIG. 3 has a rectangular shape, may however also have any other suitable shape, e.g. round, oval, elliptic, triangular, trapezoid. In FIG. 3, the vehicle 10 and the captured immediate vehicle environment 30 are shown in top view.

Figure 4:
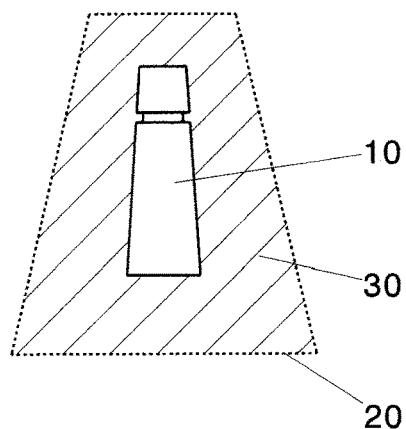
FIG. 4 shows an exemplary representation of a further perspective representation of the display image of FIG. 3.

Referring now to FIG. 4, the display image 20 has a trapezoid form and shows the vehicle 10 and the captured immediate vehicle environment 30 in bird's eye view in the forward direction of the vehicle 10 from rear to front. Due to the bird's eye view of FIG. 4, the vehicle 10 is illustrated on the display image 20 in a partly distorted manner.

Figure 5:
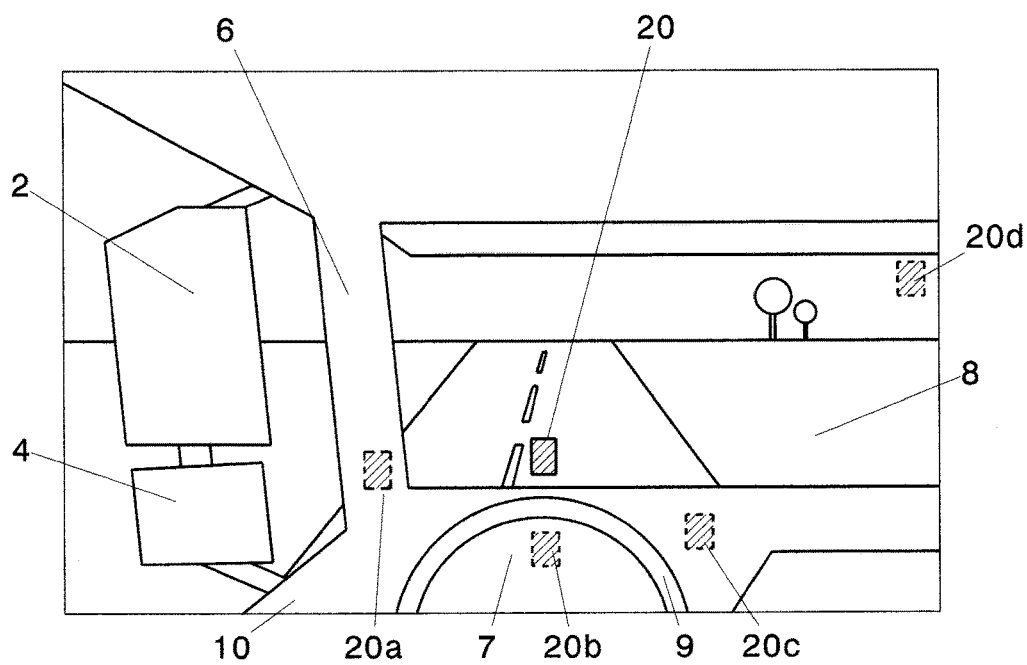
FIG. 5 shows a schematic representation of an exemplary interior space of a vehicle, with a plurality of possible arrangements of the display image.

FIG. 5 schematically shows the driver's cabin of vehicle 10 from the driver's perspective. FIG. 5 discloses, among other things, that the main mirror 2, the wide-angle mirror 4, and the A-pillar 6 partly block direct view of the vehicle environment (cf. FIG. 2). Further, FIG. 5 shows various positions where a rendering unit of the display system may display the display image 20-20d. Preferably, the position of the display image 20, which may be projected by the rendering unit, e.g. a projector, head-up display, or OLED display, is at a windshield 8 of the vehicle. The displayed image 20 is preferably located on the lower portion of the windshield 8 and centrally ahead of the driver, i.e. slightly above the steering wheel 9. Alternative positions of the display image 20a-20d are, for example, a projection on the A-pillar 6, a representation on the instrument panel 7, a representation or projection beside the steering wheel 9, or in an upper, substantially central portion of the windshield 8.

In a further embodiment, a separate screen, on which the display image 20 can be projected, may be attached inside the vehicle. The screen is preferably located between the driver and the windshield 8, e.g. on the instrument panel. In order to achieve an optimum projection of the display image 20 on the screen, the screen may be angled with respect to the windshield 8. In particular commercial vehicles have almost vertically extending windshields, and thus an angled screen may improve projection and presentation of the display image 20. The screen may be completely transparent, semi-transparent, or even non-transparent.

Figure 6A:
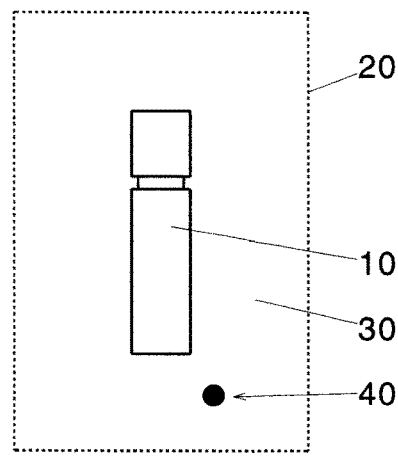
FIGS. 6a-6c show an exemplary display image at different times, which includes stylized or symbolic representations of the vehicle and an obstacle determined in the immediate vehicle environment.
Figure 6B:
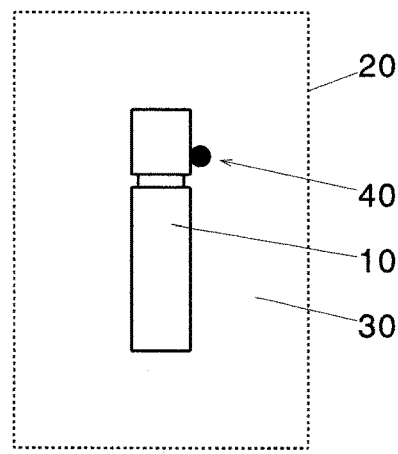
Figure 6C:
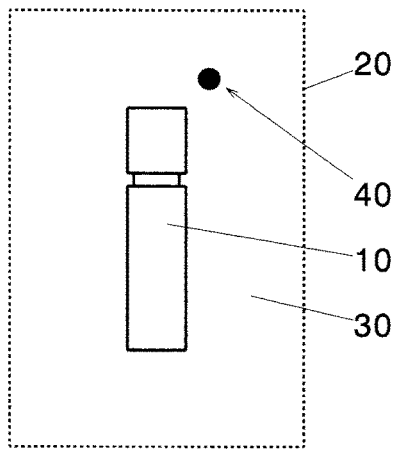

FIGS. 6a-6c show exemplary display images 20 at different points in time, which respectively include the vehicle and an obstacle 40, e.g. a pedestrian, determined in the immediate vehicle environment 30. The obstacle 40 illustrated in FIGS. 6a to 6c is symbolically shown the display image 20, and has the form of a circular dot. For illustrative purposes, FIGS. 6a-6c show the vehicle 10 in front of a red traffic light at a crossing. At a first point in time shown in FIG. 6a, the obstacle 40 is still on the right behind the vehicle 10, e.g. on a pavement that is not illustrated in the display image. At a later point in time, which is shown in FIG. 6b, the obstacle has moved just besides the vehicle 10. In this position, the driver cannot directly view the obstacle, and even hardly view it by means of the side mirrors. At an even later point in time, which is shown in FIG. 6c, the obstacle 40 has moved even further forward and is now positioned on the right side in front of the vehicle 10. Also at this point in time, the driver may hardly view the obstacle 40 by means of direct view of by means of the mirrors of the vehicle 10. By means of the display system, however, the driver may be provided with a display image that is shown continuously or in clocked intervals, which image informs the driver about the immediate vehicle environment at the times illustrated in FIGS. 6a-6b, and by means of which the driver may quickly and reliably perceive the obstacle 40.

Figure 7:
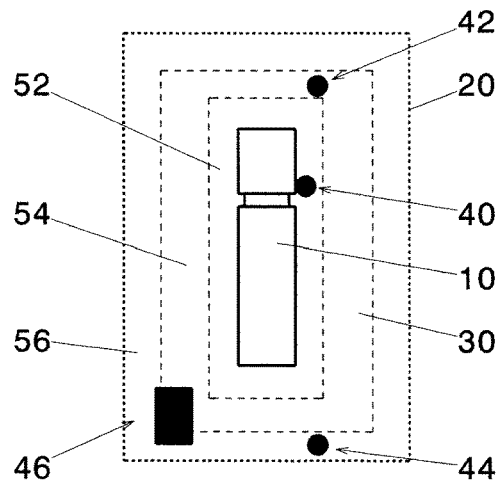
FIG. 7 shows a further exemplary display image, which is divided into a plurality of zones, and includes stylized or symbolic representations of the vehicle and of two different obstacles in the immediate environment of the vehicle.

FIG. 7 shows an exemplary display image 20, which includes the vehicle 10, identified obstacles 40, 42, and 44 like, for example, pedestrians, and an identified obstacle 46 like, for example, a vehicle. Further, it is clear from FIG. 7 that the immediate vehicle environment 30 contained in the display image 20 is divided into three zones, i.e. a zone 52 close to the vehicle, a middle zone 54, and a remote zone 56. The zones 52, 54, 56 are respectively delimited from each other by means of dotted lines, wherein the dotted lines may be either illustrated in the display image 20, or may alternatively be not visible in the display image 20. The zones 52, 54, and 56 illustrate critical, less critical, and partly uncritical regions, dependent on the distance to the vehicle 10. In other embodiments, the zones 52, 54, and 56 may be defined dependent on other parameters, e.g. their visibility by the vehicle driver, so that directly visible regions are classified as uncritical, and regions that are not directly visible like, for example the blind spot areas, are classified as critical regions.

If a calculation unit of the display system determines an obstacle in zone 52, the calculation unit may modify the display image such that the critical obstacle 40 is highlighted, i.e. in red color and/or blinking and/or otherwise modified. Similarly, the obstacles 42 and 44, which are located in different zones 54, 56, are also differently illustrated, i.e. having different colors or different brightness or luminance. The obstacle 46, which is partly located in zone 54 and partly located in zone 56 may be illustrated dependent on whether its larger portion is located in zone 54 or zone 56. The representation of the obstacle 46 corresponds to representations of obstacles of zone 54, i.e. the zone in which the major part of the obstacle 46 is located.

Figure 8:
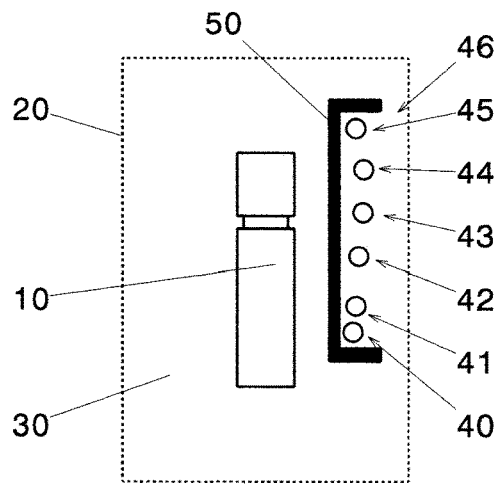
FIG. 8 shows a further exemplary display image, which includes information pointing to a group of obstacles.

Referring now to FIG. 8, a further exemplary display image 20 is illustrated. The display image 20 includes a stylized representation of the vehicle 10 and a plurality of obstacles 40-45, which are located in a joint region of the vehicle environment 30 relative to the vehicle. In order to simplify orientation on and reading/evaluation of the display image, the calculation unit may summarize obstacles 40-45 within a joint region in the environment of the vehicle to a group 48 of obstacles, and mark the same by means of a certain hint 50, e.g. a bracket.

Here, the obstacles 40-45 as shown in FIG. 8 may be of the same kind/type. In further embodiments, different types of obstacles within a joint/common region of the vehicle environment may form one group of obstacles. In one embodiment, the hint 50 may be configured such that the group of obstacles 48 is only partly framed, so that the individual obstacles 40-45 are still easily recognizable. In a further embodiment, however, the hint 50 may be configured such that the individual obstacles 40-45 are completely covered by the hint 50 and, accordingly, the obstacles 40-45 are no longer individually recognizable. In a still further embodiment, the hint 50 does cover the obstacles 40-45, is, however, at least partly transparent, so that the individual obstacles 40-45 are still at least partly recognizable.

Figure 9:
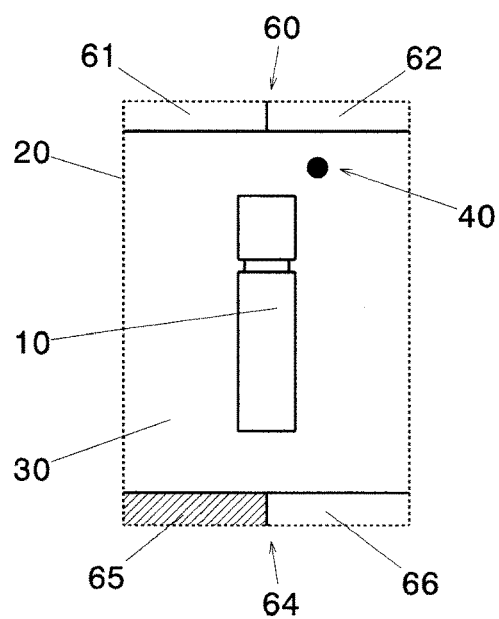
FIG. 9 shows a further exemplary display image, which includes upper and lower information portions pointing to obstacles which are located in the remote vehicle environment.

Referring now to FIG. 9, a further exemplary display image 20 is shown. The display image 20 shown in FIG. 9 includes the vehicle 10 and the stylized or symbolic representation of an obstacle 40 determined in the immediate vehicle environment 30. Additionally, the display image 20 of FIG. 9 includes an upper information region 60, which is divided in two sections 61, 62, and a lower information region 64, which is divided in two sections 65, 66, wherein, in other embodiments, the information regions 60 and 64 may respectively have only one section or more than two sections. When the calculation unit determines an object in the remote vehicle environment, the calculation unit may modify the information region corresponding to the approximate position of the obstacle in the remote vehicle environment relative to the vehicle such that the driver is provided with information about the obstacle in the remote vehicle environment. If, for example, a fast moving vehicle approaches from left behind the vehicle (cf. FIG. 9), the calculation unit modifies the representation of the left section 65 of the lower information portion 64, e.g. by means of hatching, coloring, or any other marking, so that the driver's attention is drawn to the fact that an obstacle in the remote vehicle environment may enter the close vehicle environment 30.

Figure 10:
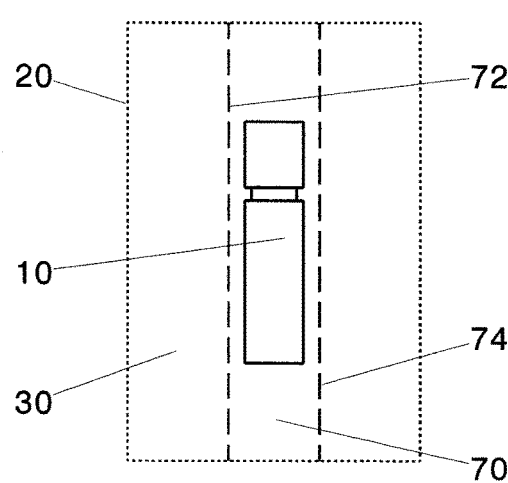
FIG. 10 shows a further exemplary display image, which includes the vehicle and road lines associated with a driving condition, while the vehicle is kept on its lane.
Figure 11:
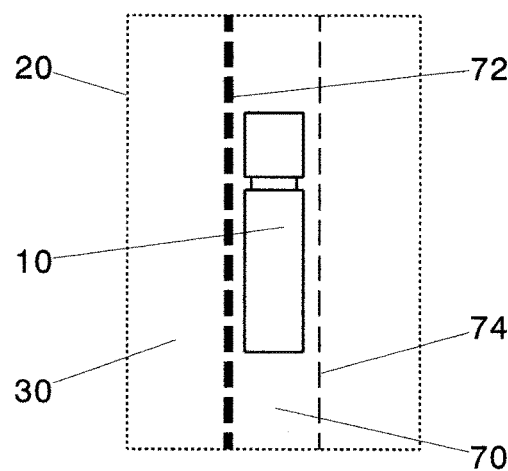
FIG. 11 shows a further exemplary display image, which includes the vehicle road lines associated with a driving condition, while the vehicle accidentally deviates from the optimum lane to the left.
Figure 12:
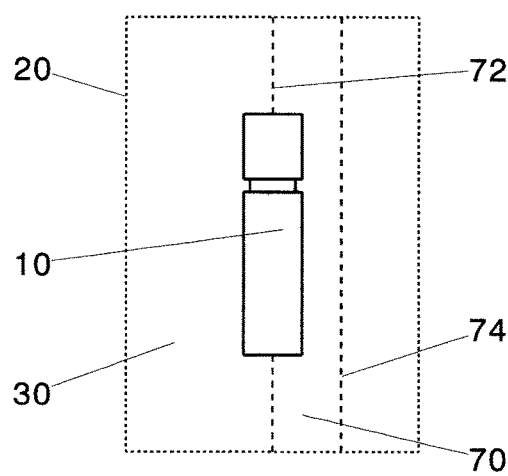
FIG. 12 shows a further exemplary display image, which includes the vehicle and road lines associated with a driving condition, while the vehicle deliberately changes lanes.

Referring now to FIGS. 10-12, further exemplary display images 20 are shown. The display images shown in FIGS. 10-12 respectively include the vehicle 10 and road lines 72, 74 defining the lane 70 of the vehicle 10. The road lines 72, 74 may, for example, correspond to the actual lines of the lane on the road. When the vehicle 10 keeps the lane as intended (cf. FIG. 10), the road lines 72, 74 are stationary with regard to the vehicle and illustrated in an identical form. If, however, the calculation unit determines that the vehicle 10 unintentionally deviates from the lane, i.e. if the calculation unit determines, for example, that no indicating signal has been used, the calculation unit may modify the display image 20 such, that the corresponding road line (road line 72 in FIG. 11) is highlighted. This is a signal for the driver that there is an unintentional deviation from the lane.

If, however, the calculation unit determines an intentional change of lanes of the vehicle 10, the calculation unit may generate the road lines 72, 74 such on the display image 20 during this process, that the road lines correspond to the actual position of the road lines 72, 74 relative to the vehicle (cf. FIG. 12).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A display system for a vehicle, comprising:
    a capturing device mountable to a vehicle and adapted to capture at least part of the immediate vehicle environment and to generate signals corresponding to the captured part of the immediate vehicle environment;
    a calculation unit associated with said capturing device and adapted to (i) receive the signals generated by the capturing device, (ii) determine obstacles in the captured immediate vehicle environment, (iii) generate a display image displaying both the vehicle in a stylized or symbolic representation and the obstacle determined in the immediate vehicle environment in a stylized or symbolic representation and its relative position with regard to the vehicle, (iv) determine a motion speed and/or motion direction of the obstacle, and (v) modify the stylized or symbolic representation of the obstacle dependent on the motion speed and/or motion direction, wherein the stylized or symbolic representation is of a vehicle, (vi) determine a trajectory of the determined obstacle and illustrate the same on the display image in the form of an obstacle trace, and (vii) evaluate the prospective trajectory of the determined obstacle and illustrate the same on the display image as prospective obstacle trace; and
    a rendering unit associated with the calculation unit and adapted to display the display image generated by the calculation unit in the vehicle and visible to a driver.

2. The display system according to claim 1, wherein the display image is a representation of the vehicle and the determined obstacle in top view or bird's-eye view in the forward direction of the vehicle from back to front.

3. The display system according to claim 1, wherein the calculation unit is further adapted to determine the kind and/or a kind of the identified obstacle or a dimension of the identified obstacle and to modify the stylized or symbolic representation of the identified obstacle dependent on the determined kind and/or dimension of the obstacle.

4. The display system according to claim 1, wherein the capturing device is further adapted to capture at least part of a remote vehicle environment and to generate signals corresponding to the captured part of the remote vehicle environment, and
    wherein the calculation unit is further adapted to determine obstacles in the remote vehicle environment and to modify the display image such, that the display image includes an information field which hints to the obstacle determined in the remote vehicle environment, and to the relative position of the determined obstacle with regard to the vehicle.

5. The display system according to claim 1, wherein the rendering unit is adapted to project the display image to the windshield of the vehicle, preferably at the lower portion of the windshield and centrically ahead of the driver of the vehicle.

6. The display system according to claim 1, wherein the rendering unit comprises a head-up display, an OLED display and/or a display unit in an instrument panel.

7. The display system according to claim 1, wherein the capturing device is adapted to capture the entire immediate vehicle environment around the vehicle.

8. The display system according to claim 1, wherein the capturing device comprises at least one radar sensor and/or at least one ultrasonic sensor and/or at least one camera.

9. The display system according to claim 1, wherein the calculation unit is further adapted to combine the obstacles determined in the immediate vehicle environment into a group of obstacles, and to modify the display image such that the display image comprises a hint pointing to the group of obstacles.

10. The display system according to claim 1, wherein the calculation unit is further adapted to divide the captured immediate vehicle environment into at least two zones, and to modify the stylized or symbolic representation of the obstacle dependent on the zone in which the determined obstacle is located.

11. The display system according to claim 1, wherein the calculation unit is further adapted to illustrate the motion of the determined obstacle relative to the vehicle on the display images in a continuous or clocked manner.

12. The display system according to claim 1, wherein the calculation unit is further adapted to illustrate the road lines on the display image, which lines illustrate a lane of the vehicle.

13. A method for displaying a display image to the driver of a vehicle, comprising the steps of:
    capturing at least part of the vehicle's immediate environment;
    determining obstacles within the captured immediate environment of the vehicle;
    determining a motion speed and/or motion direction of the obstacle;
    modifying the stylized or symbolic representation of the obstacle dependent on the motion speed and/or motion direction; and
    displaying a display image within the vehicle and visible for the driver, the display image includes the vehicle in stylized or symbolic representation and the obstacle determined in the vehicle's immediate environment in a stylized or symbolic representation and its relative position with regard to the vehicle; determining a trajectory of the determined obstacle and illustrating the same on the display image in the form of an obstacle trace; and evaluating the prospective trajectory of the determined obstacle and illustrating the same on the display image as prospective obstacle trace.

14. The method according to claim 13, further comprising:
    determining a kind of the identified obstacle or a dimension of the identified obstacle, and
    modifying the representation of the obstacle identified in the vehicle's immediate environment dependent on the determined kind and/or dimension of the obstacle.

15. The method according to claim 13, further comprising:
    capturing at least part of a remote vehicle environment,
    determining obstacles within the remote vehicle environment, and
    modifying the display image such that the display image includes an information field that hints to the obstacle determined in the remote vehicle environment, as well as to the relative position of the determined obstacle with regard to the vehicle.

* * * * *